July 22, 1958  D. J. MARSHALL  2,844,194
PORTABLE POWER-OPERATED TIRE REMOVING TOOL
Filed Oct. 6, 1954  2 Sheets-Sheet 1
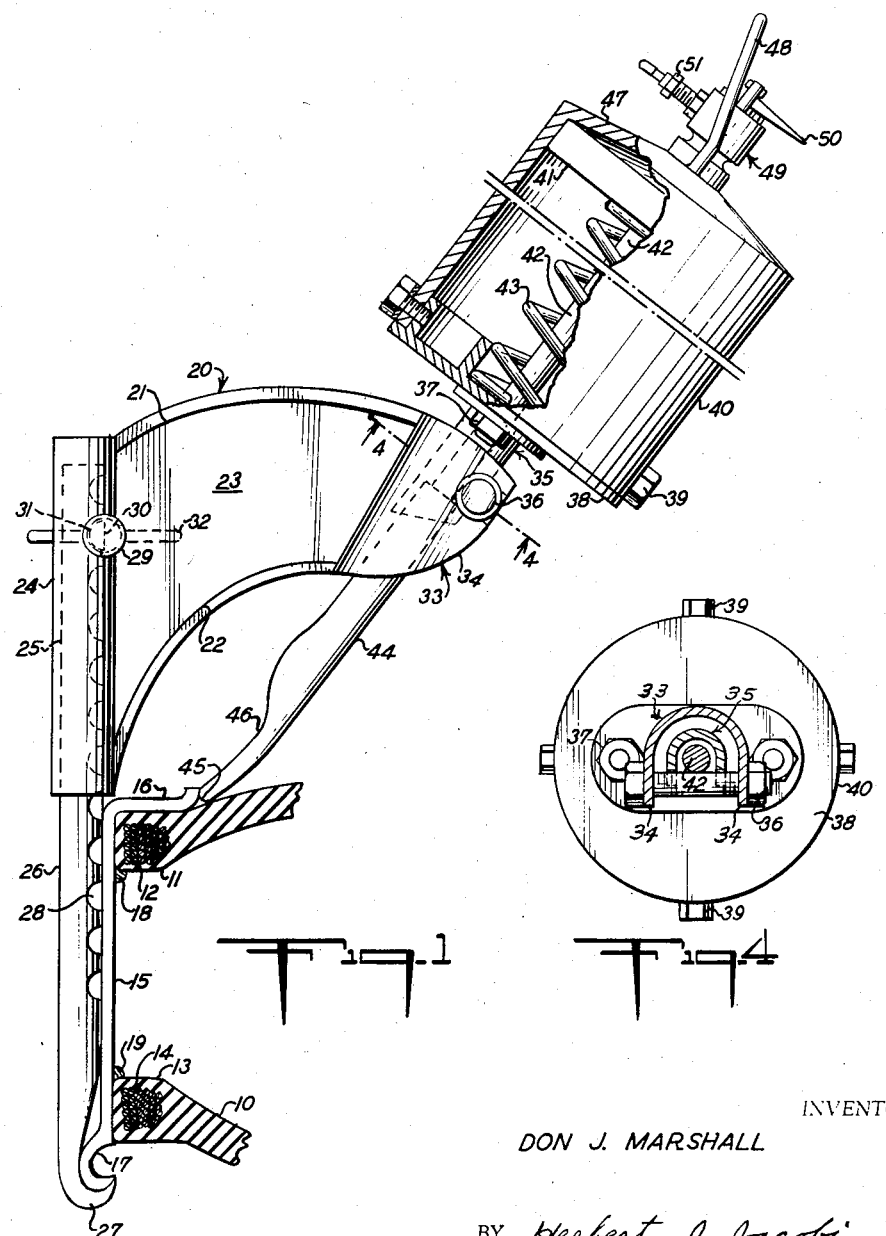
INVENTOR
DON J. MARSHALL
BY Herbert J. Jacobi
ATTORNEY

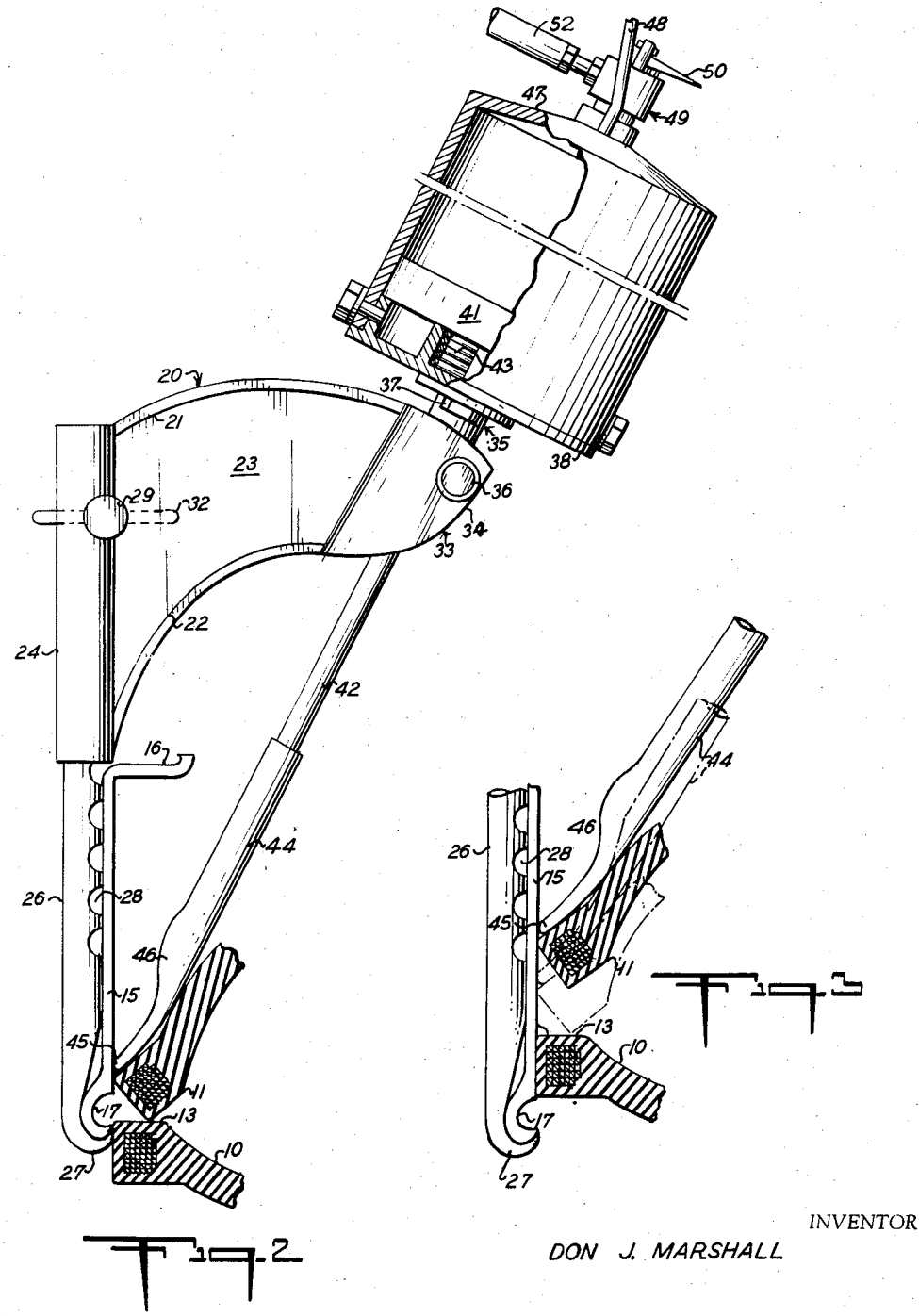

United States Patent Office 2,844,194
Patented July 22, 1958

2,844,194
PORTABLE POWER-OPERATED TIRE REMOVING TOOL

Don J. Marshall, Baltimore, Md., assignor of one-half to Marshall H. Wentz, Baltimore, Md.

Application October 6, 1954, Serial No. 460,647

1 Claim. (Cl. 157—1.26)

This invention relates to vehicle maintenance and more particularly to a portable power-operated tool for facilitating the removal of pneumatic tires from the rims on which they are mounted, particularly the relatively large tires utilized on trucks and busses. This invention represents an improvement over the tool disclosed and claimed in my co-pending application Serial No. 348,219, filed April 13, 1953, now Patent No. 2,728,383.

As is well-known, pneumatic tires mounted on metallic rims after a relatively long period of use have a tendency to become very securely bonded to such rims, by reason of the rust and corrosion which forms on such rims and adjacent the rim engaging beads of the tire. In the relatively small tires used on pleasure cars and other relatively small vehicles, this is no great problem, but with the large and heavy tires utilized on trucks and busses, this bond is so great as to result in an extremely difficult and at times, dangerous operation in removing the tires from the rims for repair thereof, and, in fact, in many instances, this bond is so secure as to resist a pressure tending to break the same of several thousand pounds per square inch.

Heretofore, many different types of apparatus have been developed and utilized for performing this operation of removing tires from rims, but many of these prior art devices have proved completely incapable of performing the job, and in fact, in many instances, use of these prior art devices have resulted in severe injury to the operators. This injury has been caused in general, by the devices slipping or becoming detached from the tire rims during the application of rather great pressures and as a result, the dislodged tools have often struck the operators with relatively great force. Furthermore, many of these prior art devices applied the removing force to the sidewall of the tire rather than to the bead, and since, as is well-known, the side wall of a tire, even in the relatively large sizes utilized in trucks and busses, is relatively weak and consequently, in many instances, the sidewall may be broken and the tire severely damaged without breaking the bond between the beads and the rim.

It is also to be noted, that many of the prior art devices for performing operations of this nature depend on a leverage action and consequently, the tire and rim must be securely held to a frame or base, which in turn is securely attached to the floor or other part of a building. Since the force utilized is relatively great, the base of machines of this type must be relatively massive, or a secure foundation to which the same is attached must be supplied, since this base or foundation must provide sufficient strength to resist the total force exerted on the lever which is utilized to operate the machine. This, of course, materially increases the cost, both of manufacture and installation of such machines and consequently, the same have not proved at all practical.

As a result of the comparative failure of prior art machines utilized for removing relatively large tires from rims, it is still the common practice for such tires to be removed from the rims by purely manual labor in which pry bars and heavy sledge hammers are utilized to break the bond between the beads of the tire and the rim. In addition to the manual labor required for this operation, the same consumes a relatively long period of time and consequently, the number of tires which may be repaired and serviced within the normal work day is materially reduced. As a consequence, the cost of tire maintenance is materially increased and therefore, any power-operated portable apparatus which will safely and efficiently perform this operation while reducing the time required therefor, represents a real step forward in the art.

It is accordingly an object of the invention to provide a portable power-operated tire removing tool which operates to break the bond between the tire beads and the rim and to completely remove the tire from such rim, without the necessity of utilizing any manual force.

A further object of the invention is the provision of a portable power-operated tire removing tool which is of relatively lightweight, and which requires no base or foundation to which the same must be attached.

A still further object of the invention is the provision of a portable power-operated tire removing tool which may be utilized to break the bond and remove a tire completely from the rim upon which the same is mounted, and in which the power for operating such tool may be obtained solely from the normal source of pneumatic pressure, commonly found in garages and the like where such tires are repaired, as well as on road service trucks normally used by bus and truck fleets.

Another object of the invention is the provision of a portable power-operated tire removing tool which may be operated by one person and which will completely remove a relatively large tire, such as those used in trucks and busses, from the rim upon which the same is mounted, in a relatively short time, of the order of one minute or less.

A further object of the invention is the provision of a portable power-operated tire removing tool in which the force utilized to break the bond and separate the tire from the rim on which the same is mounted is applied solely to the relatively strong beads of the tire.

A still further object of the invention is the provision of a portable power-operated tire removing tool in which breakage of the bond between one bead and the rim is accomplished solely by a wedging action between the rim flange and such bead and in which the bond between the other bead and the rim is broken by a pushing action transverse to such rim.

Another object of the invention is the provision of a portable power-operated tire removing tool in which slippage thereof is prevented, thereby protecting the operator from injury.

Still another object of the invention is the provision of a portable power-operated tire removing tool which upon application of power is automatically locked to the wheel rim and upon the removal of power is automatically released therefrom.

A further object of the invention is the provision of a portable power-operated tire removing tool which is of relatively lightweight and economical construction and which, if desired, may be conveniently utilized on the road for emergency repairs and requiring relatively unskilled labor for the operation thereof.

Further objects and advantages of the invention will be apparent from the following description taken in conjunction with the accompanying drawing wherein:

Fig. 1 is a view in side elevation with parts broken away and in section for greater clarity and showing the tool constructed in accordance with this invention and applied to a tire and rim just prior to the application of force for breaking the bond between one of the beads and the tire rim;

Fig. 2, a view similar to Fig. 1, and showing the relative position of the various parts of the tool after breakage of the bond between both beads and the rim with consequent complete removal of the tire from such rim;

Fig. 3, a fragmentary view showing the intermediate positions occupied by the tire and rim engaging chisel during the bond breaking and tire removing operation; and Fig. 4, a sectional view on the line 4—4 of Fig. 1.

With continued reference to the drawing there is shown a pneumatic tire 10 which is provided on its inner circumference with a bead 11 reinforced by strands of wire 12 and a bead 13 reinforced by strands of wire 14. The beads 11 and 13 are normally received on a rim 15 having a bead-engaging flange 16 on one edge thereof, and an annular groove 17 on the opposite edge for receiving a ring which serves to retain the tire 10 in place on the rim 15. It has been found, that after a period of use, the beads 11 and 13 become securely bonded to the rim 15, by reason of rust and corrosion between the same, and in fact, it has been found that such rust and corrosion will habitually form a fillet 18 and 19 adjacent the line of juncture between the inner edges of the beads 11 and 13 and the adjacent surface of the rim 15. Obviously, due to this rust and corrosion and particularly the fillets 18 and 19 thereof, very appreciable force is required to move the tire 10 transversely of the rim 15 in order to remove the same therefrom in the event repairs to the tire or replacement thereof are necessary.

A tool constructed in accordance with this invention is shown in Fig. 1, and this tool may well comprise a body 20 of generally curved configuration and having a cross-section similar to an I beam, there being flanges 21 and 22 on opposite edges of the body and connected by a web 23. The body 20 may, of course, be of such thickness and of such material as will provide the necessary strength.

At one end of the body 20 there may be provided an elongated, tubular portion 24, which may be secured to the body 20 by welding or the like, or, if desired, may be formed integral therewith. The tubular portion 24 is provided with a bore 25 extending therethrough and slidably received within this bore 25 is a bar 26 provided at one end thereof with a hook 27. The purpose of this hook 27 will be later described. The bar 26 may be provided with a plurality of transversely extending spaced notches or grooves 28 in one side thereof, which notches or grooves 28 are utilized to lock the bar 26 in adjusted position in the tubular portion 24 and for this purpose, there is provided a locking bolt 29 rotatably mounted in the tubular portion 24 and extending transversely thereof. The bolt 29 is provided with a flattened portion 30 and with a semi-circular or arcuate portion 31 and complementary to the notches or grooves 28 and when the arcuate portion 31 is in engagement with one of the notches or grooves 28, the bar 26 is locked in position against movement axially of the tubular portion 24. When it is desired to adjust the bar 26 with relation to the tubular portion 24, the bolt 29 is rotated until the arcuate portion 31 is out of engagement with the notches or grooves 28, and the flattened portion 30 is facing the side of the bar 26, at which time, the bar 26 may be moved to the desired position whereupon the bolt 29 will again be rotated to bring the arcuate portion 31 into engagement with the appropriate notch or groove 28. A finger-engaging handle 32 may be provided on the bolt 29 to facilitate operation thereof.

On the opposite end of the body 20 from the tubular portion 24 there is provided a yoke 33 having spaced arms 34, and these arms 34 may serve to pivotally mount a bracket 35 by means of pivot pins 36 or other suitable means.

The bracket 35 is secured by screw-threaded fastening means or the like 37, to a cylinder head 38, which in turn is secured by screw-threaded fastening means or the like 39 to a cylinder 40. Cylinder 40 serves to slidably receive a piston 41 which in turn is provided with a piston rod extending through the cylinder head 38 and bracket 35 and projecting downwardly and toward the bar 36 at an angle thereto. If desired, a compression spring 43 may be received around the piston rod 42 between the underside of the piston 41 and the inner side of the cylinder head 38 in order to move the piston 41 and the piston rod 42 to retracted position, but, of course, if desired, the spring 43 may be dispensed with and the piston 41 moved to retracted position by any other desired means, such as fluid pressure. The piston rod 42 is provided on the outer end thereof, with a chisel 44 having a generally wedge-shaped end 45 and provided with a cam surface 46 on one side thereof, the purpose and operation of which will be later described.

The opposite end of the cylinder 40 from the removable cylinder head 38 may be provided with a cylinder head 47 which may be either integral or removable, but for convenience of illustration, the same is shown as integral in the drawings. Mounted on this head 47 is a handle 48 which may be conveniently utilized for carrying and manipulating the tire removing tool of this invention. Disposed adjacent the handle 48, is a control valve 49 provided with a finger-engaging knob 50 for conveniently manipulating the same, and the control valve 49 may communicate with the interior of the cylinder 40 and is provided with a fitting 51 for receiving a hose 52 or other suitable fluid pressure conduit, which, of course, is connected to a suitable fluid pressure source, such as the source of compressed air normally found in garages and other places normally engaged in repairing and servicing pneumatic tires.

In operation the portable tire removing tool of this invention may be utilized by a single operator who may manipulate the same by grasping the handle 48 and by engaging the hook 27 of the bar 26 with the edge of the rim 15 opposite to the flange 16. During this operation the tire 10 and rim 15 will normally be laid flat on the floor with the flange 16 uppermost. Of course, the bar 26 will be adjusted in the tubular portion 24 in such a manner that the hook 27 will engage the lower edge of the rim 15 with the lower end of the tubular portion 24 closely adjacent the flange 16 on the upper edge of the rim 15.

At this stage of the operation, the piston 31 and piston rod 42 is, of course, retracted, as shown in Fig. 1, to bring the wedge-shaped point 45 of the chisel 44 closely adjacent the line of juncture between the bead 11 of the tire 10 and the flange 16 of the rim 15. Adjustment of the bar 26 in the tubular portion 24, also results in proper location of the wedge-shaped point 45 of the chisel 44. At this time, fluid pressure is applied to the cylinder 40 by manipulation of the finger-engaging knob 50 on the valve 49, which results in the movement of the piston 41 and piston rod 42 thereby forcing the wedge-shaped point 45 of the chisel 44 between the flange 16 and the bead 11 of the tire 10, as shown in Fig. 3. The cam surface 46 of the chisel 44 engages the inner surface of the flange 16 thereby providing a wedging or camming action between such flange 16 and the bead 11, thereby developing an extremely powerful force which will break the bond between the bead 11 and the rim 15, and, at the same time, will, of course, break the fillet 18 between such bead and rim and move the bead 11 a relatively short distance transversely of the rim 15. It is to be noted, that this breaking force is exerted solely on the bead 11 and the flange 16 and that the breaking force is supplied solely by the wedging action of the chisel 44, by reason of the cam surface 46. Thus the breaking force applied by the chisel 44 is applied to the strongest part of the tire 10 and no undue deformation or breakage of the sidewall of such tire is possible, thereby preventing damage thereto.

It is also to be noted, that application of fluid pressure to cylinder 40 of and movement of chisel 44 into engagement with the tire 10 and rim flange 16, results in upward movement of hook 27 into firm engagement with the edge of the rim 15 opposite the flange 16. This provides a reaction force directly proportional to the force exerted by the chisel 44 and automatically and positively locks the tool in operative position upon application of fluid pressure to the cylinder 40. Release of fluid pressure and retraction of the chisel 44 by compression spring 43, or other suitable means, automatically unlocks the tool from the rim and permits movement to another location on the same rim or to another tire and rim if the removal operation is completed.

Such automatic locking of the tool in operative position and unlocking, materially contributes to the speed and convenience of operation of the device and to a great extent, results in the provision of a tool easily operable by one man.

As shown in Fig. 3, continued movement of the chisel 44 by the piston 41 brings the point 45 thereof, into engagement with the inner surface of the rim 15 and, at this time, such engagement will result in a camming action tending to tilt the cylinder 40 and chisel 44 carried thereby about the pivot pins 36 carried by the yoke 33 on the body 20 and this tilting movement of the cylinder 40 and chisel 44, will be such as to permit sliding movement of the point 45 of the chisel 44 along the inner surface of the rim 15 transversely thereof. This movement of the chisel 44 will, of course, move the bead 11 downwardly on the rim 15 and into engagement with the other bead 13 at the opposite side of the rim. Continued movement of the chisel 44 will result in the bead 11 engaging the bead 13 with sufficient force to break the fillet 19 and the bond between the bead 13 and rim 15, it being noted that this force is somewhat less than that required for breaking the bond between the bead 11 and the rim 15, since the fillet 19, in this case, is located inwardly of the bead 13 and on the same side thereof as the application of the breaking force, whereas in the case of the bead 11, the fillet 18 is located on the opposite side of the bead from the application of the breaking force. The movement of the chisel 44 transversely of the rim 15 is sufficient to completely remove both beads 11 and 13 from the rim 15, as shown in Fig. 2.

After completion of this removal operation, the piston 41 and chisel 44 may be retracted by means of the spring 43 or by any other suitable means, and the tool of this invention is then in condition for the next operation. This may consist in moving the tool to another location on the rim and repeating the operation. The tool may be operated at a sufficient number of spaced locations around the rim to completely remove the tire therefrom but usually three operations at spaced locations will accomplish this result. This entire removal operation requires an extremely short time, and in fact, it has been found in practice, that the largest tires which have been in use over a period of many months time and which consequently, are very firmly bonded to the rim, may be completely removed therefrom in a matter of seconds, or at most, in a time interval of less than the order of one minute. This is to be compared with the normal manual operation of removing a tire from a rim, which has heretofore been employed and which in many instances, requires a period of time considerably greater than thirty minutes. Even in cases where a tire has been mounted on a rim only a short period of time and has therefore, not become firmly bonded thereto, the time required for removing such tire by conventional methods, greatly exceeds the time in which such tire may be removed by utilizing the tool of this invention.

It has also been found that present day prior art machines utilized by relatively large truck and bus fleets and far more costly than the tool of this invention are extremely slow and cumbersome and, in fact, it may be conservatively stated, that the tool of this invention will remove two or more tires while the above mentioned machines are removing one of comparable size and difficulty.

It will therefore be seen, that by the above described invention there has been provided a portable power tool which may be utilized for breaking the bond and completely removing a relatively large pneumatic tire, such as those used in trucks and busses, from the rim upon which the same is mounted, which tool may be utilized, either in a garage or on the road, it only being necessary to provide a source of fluid pressure therefor, and also the tool of this invention is of relatively light weight and may be conveniently manipulated and operated by a single person. Furthermore, by reason of the structure thereof and the manner of operation, there is no danger, whatsoever of the tool slipping during use and thereby injury to the operator or damage to the tire or to the tool is completely eliminated. Furthermore, the tool of this invention is susceptible of such economical construction that the same may be readily available to even the smaller tire repair shops and roadside service stations.

It will be obvious to those skilled in the art that various changes may be made in the invention without departing from the spirit and scope thereof, and therefore the invention is not limited by that which is shown in the drawing and described in the specification, but only as indicated in the appended claim.

What is claimed is:

A portable power-operated tool for breaking the bond between a tire rim and the beads of a tire mounted thereon, and for removing said tire from said rim, said rim having an integral bead-engaging flange on one edge and a removable bead-engaging flange on the opposite edge, said tool comprising a curved body of generally I beam cross-section, a tubular portion on one end of said body, a bar slidably received in said tubular portion and having a hook on one end providing an abutment for engaging the edge of said rim opposite said integral flange, means for releasably locking said bar in adjusted position in said tubular portion, a yoke on the opposite end of said body, a fluid pressure cylinder, a cylinder head on one end of said cylinder, a bracket secured to said cylinder head, means pivotally mounting said bracket on said yoke, a piston in said cylinder, a piston rod connected to said piston and extending through said cylinder head towards said bar at an angle thereto away from said body and toward said hook, said piston and piston rod having a length of travel at least as great as the width of said rim, a chisel of generally wedge formation fixed to the end of said piston rod, a second cylinder head on the opposite end of said cylinder, a handle on said cylinder head and a control valve adjacent said handle communicating with said cylinder and a source of fluid pressure to control operation of said piston whereby movement of said piston will move said chisel into engagement with said integral flange and bead and draw said hook into locking engagement with the edge of said rim opposite said integral flange to lock said tool in operative position on said rim, further movement of said piston operating to force said chisel between said bead and said integral flange and break the bond between said bead and said rim solely by the wedging action of said chisel, continued movement of said chisel into engagement with said rim causing said cylinder to pivot on said pivotal mounting and said chisel to force said bead transversely of said rim, into engagement with the other bead to break the bond between said other bead and said rim and remove said tire from said rim, and upon retraction of said piston to move said chisel out of engagement with said rim, said hook will be automatically released from locking engagement with said rim.

(References on following page)

References Cited in the file of this patent

UNITED STATES PATENTS

| | | |
|---|---|---|
| 1,567,276 | Kowalzcyk et al. | Dec. 29, 1925 |
| 2,495,117 | McCollister | Jan. 17, 1950 |
| 2,535,562 | Boger et al. | Dec. 26, 1950 |
| 2,606,602 | Manupello | Aug. 12, 1952 |
| 2,621,715 | Lien et al. | Dec. 16, 1952 |
| 2,679,896 | Branick | June 1, 1954 |
| 2,728,383 | Marshall | Dec. 27, 1955 |

FOREIGN PATENTS

| | | |
|---|---|---|
| 698,887 | Great Britain | Oct. 28, 1953 |